United States Patent Office 2,899,330
Patented Aug. 11, 1959

2,899,330
SOIL STABILIZATION

John W. Lyons, Reading, Mass., assignor to Monsanto Chemical Company, St. Louis, Mo., a corporation of Delaware No Drawing. Application March 29, 1957
Serial No. 649,300

17 Claims. (Cl. 106—287)

This invention relates to novel improved procedures for the stabilization of soils and to the novel soil compositions prepared thereby. More specifically this invention relates to an improved procedure for substantially improving the structural properties of clay soils whereby the said soils are treated with a minor amount of phosphoric acid and a minor amount of an alkenyl polyamine such that the treated soil can be employed as a suitable base material for various construction projects.

Soils containing substantial quantities of clay are presenting an ever increasing problem to construction engineers, especially in the building of modern highways and the construction of airfields capable of adequately handling present heavy aircraft. It is well known that clay soils may have a high compressive strength when dry but that generally they have substantially no strength when wet. Accordingly, past practice initially largely avoided the problem by laying out highways and airfields in areas that did not possess problem soils and when it became necessary to go into these areas the practice generally required hauling in gravel and crushed stone in substantial quantities to provide a suitable subgrade. The present and foreseeable future materially increased wheel loads of truck transports and aircraft; the increasing unavailability of select sites having suitable construction and foundation soils particularly in the more populated areas, excluding the prohibitively expensive procedures of taking occupied land; the fact that modern highways are designed to provide the shortest reasonable distance between the principal cities such that they no longer can entirely circumvent the areas of problem soils; and the dwindling supply of economically available granular soils, crushed stone and gravel in many areas, when considered in the light of the vast construction program which is planned clearly indicate the seriousness of this problem.

Various chemicals have been suggested and employed for the purpose of improving the bearing load of soils, for example Portland cement, lime, calcium chloride, sodium silicate, various bituminous materials, aniline-furfural resins, calcium acrylate resins, and the like. Normally the chemicals are added in relatively large amounts, thus the various inorganic materials frequently require the addition of 10 percent or more, based on the dry weight of the soil. Whereas Portland cement probably has been used more widely and with greater success than any other soil stabilization material and is usually employed at from about 10 to about 15 percent by weight of the dry soil, it is not recommended for highly plastic soils. Thus, soils having a plastic index of more than about 16 to 18, wherein the plastic index expresses the range of moisture content over which the soil is plastic and is defined as the moisture content at the liquid limit minus the moisture content at the lower plastic limit, are generally not satisfactorily stabilized in the field with cement.

It has recently been found that from about 1 to about 5 percent, by weight of the dry clay-containing soil, of orthophosphoric acid effects a suitable means of substantially improving the structural properties of clay soils as disclosed and claimed in my copending application Serial No. 649,284, filed March 29, 1957. However some clay soils are difficult to work with the application of phosphoric acid and other stabilizers. Also it has been found that, e.g. both soil-cement and soil-phosphoric acid compositions are generally characterized by a relatively sharp maxima in wet compressive strength versus the molding moisture relationship. Accordingly, the requirement of obtaining frequent soil samples and the determination of the moisture content thereof during construction to maintain treatment conditions within the optimum range adds to the cost of construction.

The principal object of this invention is to provide a means of substantially improving the wet structural strength of clay-containing soils. Another object of this invention is to treat clay-containing soils having a plastic index of greater than about 15 to provide a soil composition suitable as subgrade for the construction of highways, airfields, and the like. Still another object of this invention is to provide an economical process which is adapted to rapid construction procedures in civilian and military service. A further object of this invention is to provide a composition which is characterized by a relatively wide range of tolerance to varying soil moisture content. A still further object of this invention is to provide a composition with improved workability, i.e. one wherein the materials can be mixed into the plastic clay soil in less time and with greater ease than prior art compositions. Other objects will be apparent from the following disclosure.

It has now been found that the addition of a mixture of from about 1 to about 5 percent and preferably from about 2 to about 3 percent of phosphoric acid and from about 0.1 to about 2 percent and preferably from about 0.25 to about 1 percent of an alkenyl polyamine, as hereinafter more fully defined, to clay-containing soils, wherein the materials are present in percent by weight based on the dry weight of the soil, effects a material improvement in the wet compressive strength of the soil and with suitable working procedures provides a subgrade soil which is satisfactory for the support of highway construction, airfield construction and the like. It has further been found that the aforesaid composition has a greatly improved tolerance to varying moisture content of the soil and is more easily mixed into the plastic clay soil than compositions which do not contain the alkenyl polyamine. It was also found that the aforesaid mixture of phosphoric acid and alkenyl polyamine provides an unexpected synergistic improvement in the structural properties of the treated clay soil as compared to the use of phosphoric acid alone as hereinafter more fully exemplified.

The various alkenyl polyamines which can be employed in this invention can be defined as the reaction products of an alkenyl chloride containing from about 8 to about 16 carbon atoms with an aliphatic or alicyclic primary or secondary polyamine, e.g. such that the product has the formula:

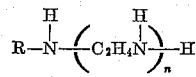

wherein R is a higher alkenyl radical containing from 8 to 16 carbon atoms and $n$ is an integer from 1 to 4. Illustrative alkenyl polyamines of this class are N-tetrapropenyl ethylenediamine, N-tetrapropenyl diethylenetriamine, N-tetrapropenyl triethylenetetramine, N-pentapropenyl ethylenediamine, N-pentapropenyl diethylenetriamine, N-(1-tert-butyl-2-methylallyl) ethylenediamine, N-(1-tert-butyl-2-methylallyl) triethylenetetramine, N-(1-tert-butyl-2-methylallyl) tetraethylenepentamine, N-triisobutenyl ethylenediamine, N-triisobutenyl diethylenetriamine, and the like. The alkenyl polyamines are prepared by the condensation of an alkenyl chloride and the amine by heating a mixture thereof at reflux temperature, as disclosed and claimed in the copending application of Thomas E. Lesslie and Robert J. O'Neill, Serial No. 640,062, filed February 14, 1957.

It is understood that the various phosphoric acid equivalents such as phosphorus pentoxide, pyrophosphoric acid, metaphosphoric acid, tetraphosphoric acid, other polyphosphoric acids, and mixtures thereof can be employed in this invention as the source of the orthophosphoric acid.

The clay-containing soils which may be benefited by the phosphoric acid treatment preferably includes those soil compositions containing from about 10 to about 70 percent clay, and more preferably still from about 20 to about 50 percent clay in accordance with the well known triaxial textural classification chart of the U.S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia, Cecil clay, Houston clay, Lake Charles clay, Capay silty clay loam, and the like. The method of this invention may also be employed in the presence of various other soil additives, which may be present in minor amounts in the clay-containing soil or added thereto after the treatment thereof with the phosphoric acid and alkenyl polyamine. Thus, for example phosphoric acid and an alkenyl polyamine can be added to various soil-cement mixtures or Portland cement may also be added to the phosphoric acid-alkenyl polyamine-clay mixture. Various other suitable combinations may also be employed.

The treatment of the clay-containing soil can be readily effected by the addition of a calculated amount of the mixture of phosphoric acid and alkenyl polyamine in the desired ratio, depending on the depth of soil treated and the moisture content of said soil, by spray application by a P and H single-pass soil stabilizer, Seaman Pulvimixer, or similar apparatus, or by application of the said mixture and water by other suitable means and mixing with various traveling pug mills, roto-tillers and the like. The phosphoric acid and the alkenyl polyamine can be added as a combined solution to the soil, or each component can be separately added to the soil at substantially the same time or at different times. Thus in the latter instance the alkenyl polyamine can first be worked into the soil and then the phosphoric acid can be incorporated therein, which practice facilitates the later mixing of the phosphoric acid. However this procedure would require working the soil twice and is generally not necessary, but may be desirable when a particularly heavy clay soil is being treated. Accordingly, it is generally preferable to apply the phosphoric acid and alkenyl polyamine to the soil as a mixture in aqueous solution. To provide the optimum moisture content to the treated soil the mixture can be diluted to any suitable concentration. Thus, the mixture can be diluted in suitable storage tanks at the construction site; can be partially diluted to a desired concentration and subsequently further diluted just prior to application to the soil, for example where two traveling tanks are employed and the concentration of the mixture is controlled by independent regulating valves into a distribution system whereby the final ratio of phosphoric acid, alkenyl polyamine and water can be readily controlled as necessary; and other suitable procedures as will be apparent to those skilled in the art. The treatment of the soil with an aqueous system also provides the further advantage of effecting a more uniform distribution of the phosphoric acid and alkenyl polyamine in the soil for a given degree of mixing in contradistinction to the prior art systems which require the initial intimate distribution of solid material therein. Normally it is desirable to treat the soil to a compacted depth of at least about 6 inches to provide a well stabilized subgrade. After the treatment of the clay-containing soil with the desired amount of phosphoric acid and alkenyl polyamine, it is compacted by the application of a sheepsfoot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired. When the combination of subbase and topping is applied the use of this invention to provide a stabilized subgrade effects a substantial saving in the quantity of subbase material which might otherwise be required.

It is generally recognized that a stabilized soil preferably should exhibit an unconfined compressive strength of at least about 100 pounds per square inch after immersion of the compacted soil in water for a time of two days and that a stabilized soil preferably should not expand, after immersion, by more than about 2.5 percent of its initial compacted volume.

The molded 2-inch by 4-inch cylindrical samples for the unconfined compressive strength evaluation were prepared with a Vicksburg compactor, which device was developed by the U.S. Waterways Experiment Station, Vicksburg, Mississippi, and modified as hereinafter described. The apparatus consists of a compaction hammer, compaction mold, base plate, and an Ames dial supported on a tripod. The hammer is a four-pound weight which slides freely on a steel rod between an upper handle and a compaction foot at the bottom. The space between handle and foot is such that the hammer has a free fall of exactly twelve inches. The compaction foot has a flat circular face with a diameter just slightly less than the inside diameter of the mold. The mold is about six inches in height and exactly two inches in inside diameter. Two "ears" are welded to the outside which fit over upright posts on the base plate. The base plate has a short piston fastened to it which projects upward about ¾ inch into the mold. After several blows were delivered to the soil in the mold a small wedge was removed so that the mold rides free supported by the friction of the compacted soil against the walls of the mold. With succeeding hammer blows a compactive effort is exerted by the lower piston on which the soil is resting. After compaction the tripod and Ames dial were placed in position so that an extension from the dial rests on top of the soil in the mold. Height can then be read to 0.001 inch on the dial indicator. To remove the compacted sample a 10-ton capacity Carver press was equipped with a collar which just clears the compaction mold of the Vicksburg compactor but does not clear the "ears" on the mold. By means of this collar and a ram which just fits inside of the mold, samples were readily ejected after compaction.

The molded samples mentioned in the examples given below were prepared using the above-described Vicksburg compactor in the following manner, unless otherwise specified. The desired mixture of soil, water, phosphoric acid and alkenyl polyamine was prepared and the necessary quantity thereof to provide compact specimens about 4±0.1 inches in height was weighed out and compacted in four roughly equal layers, each layer receiving twelve blows from the four-pound hammer falling through a vertical distance of twelve inches. After the first five blows on the first layer, the metal wedge under the mold was removed, thus allowing the piston in the base plate to exert a compactive effort on the bottom of the soil with each succeeding blow. Another portion of the soil mixture was employed to determine the moisture content of the sample (total volatiles at 110° C. for 16 hours). The compacted sample was then ejected and cured at about 68 to about 70° F. and about 100 percent relative humidity for five days and then immersed in water at about 68 to 70° F. for a period of two days.

The unconfined compressive strength was determined using an electrically driven AP-170 stability compression testing machine wherein the loading rate was 0.25 inch per minute. A brass plate exactly two inches in diameter was placed on the top of the soil specimens, a ball bearing placed in a depression in the upper surface of the plate and the machine put into operation. The load was uniformly applied and the maximum stress before failure of the test sample, measured in pounds per square inch, was noted.

The clay from the Hybla Valley in Virginia used for many of the following experiments is composed of about 33 percent clay, 24 percent silt, and 43 percent sand. This clay was found to have a plastic index of about 24, an optimum moisture content for compaction of about 15 percent, a maximum dry density of about 117 pounds per cubic foot, the volume change when saturated was 9.2 percent, and the unconfined compressive strength after 5 days cure at about 68 to 70° F. and about 100% relative humidity and 2 days of soaking in water ranged from about 0 to about 4 pounds per square inch.

The following examples are illustrative of the instant invention.

*Example 1*

For relative comparative purposes test samples were prepared by the addition of the better commercial soil stabilizers now in use to a portion of the clay from the Hybla Valley in the amounts indicated, based on the dry soil weight, and varying amounts of water were added thereto to provide the percent moisture indicated in the following table. The test samples were cured for five days and then immersed in water for two days prior to the determination of the unconfined compressive strength tests, which evaluation data is summarized in the following table.

| Sample | Percent water in molded soil | Dry density, lbs./ft.³ | Unconfined compressive strength, p.s.i. |
|---|---|---|---|
| Control | 16.0 | 116.1 | 2 |
| 10% lime | 15.4 | 101.8 | 50 |
| Do | 17.4 | 102.8 | 72 |
| Do | 19.7 | 104.2 | 88 |
| Do | 22 | 102.4 | 87 |
| 9% Portland cement | 14.5 | 108.8 | 118 |
| 12% Portland cement | 15.1 | 107.8 | 282 |

*Example 2*

Several series of unconfined compressive strength test samples were prepared wherein various amounts of phosphoric acid were added to the clay soil to provide 1, 2 or 3 percent by weight of 100% $H_3PO_4$, based on the oven-dry weight of the soil, and said samples were prepared over a range of moisture conditions by varying the quantity of water added to the soil. Other similar samples were also prepared wherein 0.5 percent by weight, based on the oven-dry weight of the soil, of N-tetra-propenyl diethylene-triamine was added to the clay soil in addition to the phosphoric acid and water. In each case the air-dried clay soil was introduced into a mixer and the various additives added thereto and mixing continued for a short time to distribute said additives throughout the soil. Then the unconfined compressive strength test samples were prepared as hereinbefore mentioned and the percent moisture content determined on portions of the non-compacted mixed clay soil material. The molded samples were cured for 5 days at about 100% relative humidity and a temperature of about 68 to about 70° F. and then immersed in water at from about 68 to about 70° F. for 2 days prior to the determination of their unconfined compressive strengths, which results are listed in the following table.

| Additive | Without A | | | With 0.5% A | | |
|---|---|---|---|---|---|---|
| | Percent water in molded soil | Dry density, lbs./ft.³ | Unconfined compressive strength, p.s.i. | Percent water in molded soil | Dry density, lbs./ft.³ | Unconfined compressive strength, p.s.i. |
| Control | 10-20 | 100-117 | 0-4 | 13-25 | 95-105 | 15-18 |
| Do | 16.0 | 116.1 | 2 | 15.4 | 103.0 | 18 |
| 1% phosphoric acid | 16.7 | 114.0 | 68 | 17.0 | 109.4 | 58 |
| Do | 18.0 | 111.9 | 75 | 18.2 | 109.2 | 79 |
| Do | 19.2 | 108.9 | 62 | 19.2 | 107.7 | 75 |
| Do | 20.1 | 106.9 | 48 | 20.7 | 105.4 | 73 |
| 2% phosphoric acid | 15.0 | 115.1 | 64 | 15.5 | 110.3 | 97 |
| Do | 16.3 | 114.9 | 113 | | | |
| Do | 17.8 | 111.8 | 98 | 17.2 | 110.5 | 116 |
| Do | 19.5 | 108.0 | 67 | 18.7 | 109.5 | 138 |
| Do | 20.2 | 106.3 | 57 | 20.2 | 106.9 | 98 |
| Do | 21.2 | 104.4 | 49 | 21.1 | 104.9 | 84 |
| 3% phosphoric acid | 15.5 | 115.4 | 156 | 15.3 | 112.6 | 144 |
| Do | 16.9 | 113.4 | 140 | 16.9 | 112.1 | 165 |
| Do | 18.6 | 109.7 | 97 | 18.3 | 110.2 | 160 |
| Do | 20.0 | 106.9 | 76 | 19.8 | 107.6 | 124 |

A = N-tetrapropenyl diethylenetriamine.

It is apparent from the above data that the addition of the alkenyl polyamine provided a clay soil composition which attained a higher maximum unconfined compressive strength than similar clay compositions containing only phosphoric acid. An even more significant modification of the physical properties of the clay soil composition is that the presence of the alkenyl polyamine provides a wider tolerance of moisture content of the soil to be treated, which effect is especially noteworthy in the relatively wetter clay soil compositions.

*Example 3*

In a similar manner to the procedure described in Example 2 another series of unconfined compressive strength test samples was prepared from a different lot of clay soil and evaluated for the relative compressive strengths, after a curing time of 5 days and immersion for 2 days, as shown in the table.

| Additive | Percent water in molded soil | Dry density lbs./ft.³ | Unconfined compressive strength, p.s.i. |
|---|---|---|---|
| 2% phosphoric acid | 13.1 | 115.3 | 3 |
| Do | 15.4 | 117.0 | 95 |
| Do | 16.3 | 114.5 | 105 |
| Do | 17.4 | 112.2 | 82 |
| Do | 19.7 | 107.2 | 50 |
| 2% phosphoric acid plus 1% A | 11.0 | 106.5 | 62 |
| Do | 13.1 | 108.0 | 93 |
| Do | 13.9 | 107.7 | 105 |
| Do | 14.6 | 107.8 | 102 |
| Do | 17.6 | 106.9 | 98 |
| 5% phosphoric acid | 12.9 | 118.2 | 6 |
| Do | 14.4 | 117.3 | 158 |
| Do | 15.5 | 115.5 | 154 |
| Do | 16.4 | 114.1 | 136 |
| Do | 18.2 | 112.5 | 78 |
| 5% phosphoric acid plus 1% A | 10.3 | 111.6 | 77 |
| Do | 12.4 | 114.0 | 118 |
| Do | 13.4 | 115.0 | 137 |
| Do | 14.2 | 114.2 | 167 |
| Do | 15.2 | 111.8 | 200 |
| Do | 17.2 | 109.8 | 187 |

A = N-tetrapropenyl diethylenetriamine.

Again it will be noted that the addition of the alkenyl polyamine greatly extends the latitude of moisture content of the clay composition which can be effectively stabilized by the addition of phosphoric acid. It is seen that with this clay soil that the moisture content is particularly critical for the composition containing phosphoric acid alone, whereas the addition of the alkenyl polyamine provides vastly improved compositions. For example the phosphoric acid (2%) alone at a moisture content of 13.1% only had a compressive strength of 3 p.s.i., but the presence of the alkenyl polyamine increased this strength to 93 p.s.i. and the phosphoric acid (5%) alone at a moisture content of 12.9% only had a compressive strength of 6 p.s.i., but the presence of the alkenyl polyamine increased this strength to about 127 p.s.i. (12.4%=118 p.s.i. and 13.4%=137 p.s.i.).

*Example 4*

In addition to the aforesaid beneficial effects shown in Examples 2 and 3, it has been determined that the addition of the alkenyl polyamine also is advantageous to reduce the volume change of molded samples of clay soils when immersed in water in a similar manner to that described in "Procedures for Testing Soils," ASTM Committee D–18 pp. 131–135 (July 1950). The data are listed in the following table.

| Additive | | 0.5 hour cure | | 24 hour cure | |
|---|---|---|---|---|---|
| Percent $H_3PO_4$ | Percent A | Dry density lbs./ft.$^3$ | Percent water in molded soil | Percent volume change[1] | Percent water in molded soil | Percent volume change[1] |
| 2 | 0 | 114.6 | 16.4 | 6.5 | 16.8 | 1.2 |
| 2 | 0 | 111.2 | 18.7 | 2.4 | 18.3 | 0.7 |
| 2 | 0 | 107.0 | 20.7 | 1.6 | 20.5 | 0.7 |
| 2 | 0.25 | 113.5 | 16.0 | 4.3 | 15.9 | 2.8 |
| 2 | 0.25 | 111.3 | 17.7 | 2.7 | 17.9 | 1.1 |
| 2 | 0.25 | 107.3 | 19.9 | 1.7 | 19.9 | 0.8 |
| 2 | 0.5 | 110.0 | 16.1 | 4.0 | 15.9 | 1.5 |
| 2 | 0.5 | 109.0 | 17.9 | 2.4 | 17.7 | 0.9 |
| 2 | 0.5 | 105.8 | 20.0 | 2.0 | 19.9 | 0.8 |
| 3 | 0 | 115.0 | 16.2 | 15.1 | 16.1 | 1.5 |
| 3 | 0 | 111.0 | 18.1 | 7.0 | 17.9 | 1.0 |
| 3 | 0 | 107.0 | 20.3 | 3.4 | 19.8 | 0.6 |
| 3 | 0.25 | 114.1 | 16.0 | 11.5 | 15.9 | 2.8 |
| 3 | 0.25 | 111.3 | 17.7 | 6.7 | 17.8 | 1.5 |
| 3 | 0.25 | 107.1 | 20.2 | 3.3 | 20.1 | 0.9 |
| 3 | 0.5 | 112.4 | 16.2 | 5.1 | 16.1 | 1.5 |
| 3 | 0.5 | 111.9 | 18.3 | 3.1 | 18.1 | 1.5 |
| 3 | 0.5 | 107.0 | 20.2 | 2.4 | 20.1 | 1.1 |

A = N-tetrapropenyl diethylenetriamine.
[1] After soaking in water for 140 hours.

It is noted from the above evaluation data that the presence of the alkenyl polyamine materially reduces the percent of volume change on immersion of the compacted soil samples, especially at the higher levels of phosphoric acid treatment and under conditions which do not provide a suitable curing period for the treated soil. However, it will be seen that after the treated soil has been cured for 24 hours or more that the soil composition is very stable as to the percent of volume change when subjected to immersion in water.

The instant invention also affords a means of providing building blocks for the construction of earth buildings and the like such as are commonly erected in Asia, Africa and South American, and particularly in areas where soil is about the only locally available building material, as for example Egypt and Israel. The building blocks can be easily produced by unskilled labor in the undeveloped portions of these areas by mixing the proper ratio of clay soil, orthophosphoric acid, alkenyl polyamine and water and compacting said mixture to approach the maximum density thereof. As indicated hereinabove the compacted treated soil has a high compressive strength even on immersion in water and will accordingly withstand rain and flood water without disintegrating as do the untreated materials.

I claim:
1. A method of effecting the stabilization of a clay-soil containing from about 10 percent to about 70 percent of clay and having a plastic index of greater than about 15 comprising the addition thereto of from about 1 to about 5 weight percent of phosphoric acid, calculated as 100% $H_3PO_4$, and from about 0.1 to about 2 weight percent of an alkenyl polyamine, defined by the formula R—NH$(C_2H_4NH)_n$H, wherein R is a higher alkenyl radical containing from 8 to 16 carbon atoms and $n$ is an integer from 1 to 4, each based on the dry weight of said soil, effecting a substantially uniform distribution of the phosphoric acid and alkenyl polyamine in the said soil and thereafter compacting the treated soil to provide a stabilized soil characterized by a substantially improved unconfined compressive strength over the untreated soil after immersion in water for at least two days.
2. The method of claim 1, wherein from about 0.25 to about 1 percent of alkenyl polyamine is employed.
3. The method of claim 2, wherein from about 2 to about 3 percent of phosphoric acid is employed.
4. The method of claim 3, wherein the phosphoric acid is wet-process phosphoric acid prepared by the wet-process reaction of sulfuric acid on phosphate rock.
5. The method of claim 3, wherein the alkenyl polyamine is N-tetrapropenyl diethylenetriamine.
6. The method of claim 3, wherein the alkenyl polyamine is N-tetrapropenyl triethylenetetramine.
7. The method of claim 3, wherein the alkenyl polyamine is N-tetrapropenyl ethylenediamine.
8. The method of claim 3, wherein the alkenyl polyamine is N-triisobutenyl diethylenetriamine.
9. The method of claim 3, wherein the alkenyl polyamine is N-pentapropenyl diethylenetriamine.
10. A method of effecting the stabilization of a clay soil having a plastic index of greater than about 15 and containing from about 20 to about 50 percent of clay comprising the addition thereto of from about 1 to about 5 weight percent of orthophosphoric acid, calculated as 100% $H_3PO_4$, and from about 0.1 to about 2 weight percent of an alkenyl polyamine, defined by the formula R—NH$(C_2H_4NH)_n$H, wherein R is a higher alkenyl radical containing from 8 to 16 carbon atoms and $n$ is an integer from 1 to 4, each based on the dry weight of said soil, effecting a substantially uniform distribution of the orthophosphoric acid and alkenyl polyamine in the said soil and thereafter compacting the treated soil to provide a stabilized soil characterized by a substantially improved unconfined compressive strength over the untreated soil after immersion in water for at least two days.
11. The method of claim 10, wherein from about 0.25 to about 1 percent of alkenyl polyamine is employed.
12. The method of claim 11, wherein from about 2 to about 3 percent of orthophosphoric acid is employed.
13. The method of claim 12, wherein the orthophosphoric acid is prepared by the wet-process reaction of spent sulfuric acid from alkylation plants on phosphate rock.
14. The method of claim 12, wherein the alkenyl polyamine is N-tetrapropenyl diethylenetriamine.
15. A composition of matter comprising a compacted composition of a clay-containing soil, wherein the soil contains from about 10 to about 70 percent of clay, having substantially uniformly added thereto from about 1 to about 5 weight percent of orthophosphoric acid, calculated as 100% $H_3PO_4$, and from about 0.1 to about 2 weight percent of an alkenyl polyamine, defined by the formula R—NH$(C_2H_4NH)_n$H, wherein R is a higher alkenyl radical containing from 8 to 16 carbon atoms and $n$ is an integer from 1 to 4, each based on the dry weight of said soil.
16. The composition of matter of claim 15, wherein the soil contains from about 20 to about 50 percent of clay.

17. The composition of matter of claim 15, wherein the soil contains from about 30 to about 70 percent of clay.

References Cited in the file of this patent

UNITED STATES PATENTS

| | | |
|---|---|---|
| 2,369,682 | Miller | Feb. 20, 1945 |
| 2,508,924 | Mertens et al. | May 23, 1950 |
| 2,550,371 | Naps | Apr. 24, 1951 |
| 2,687,358 | Alberry et al. | Aug. 24, 1954 |

OTHER REFERENCES

Lambe et al.: "Chem. Eng. News," 32, 488 (1954), 488–492.

Agricultural Chemicals 5 #5, 33–34 (1950), S583A3.